United States Patent [19]

Hurst

[11] 4,270,741
[45] Jun. 2, 1981

[54] DOOR VISE

[76] Inventor: Paul N. Hurst, 5125 Colorado Blvd., Fort Worth, Tex. 76118

[21] Appl. No.: 106,472

[22] Filed: Dec. 26, 1979

[51] Int. Cl.³ .............................................. B25B 11/00
[52] U.S. Cl. ........................................ 269/17; 269/33; 269/905
[58] Field of Search ...................... 269/17, 133, 321 F

[56] References Cited

U.S. PATENT DOCUMENTS

| 1,715,722 | 6/1929 | Smith et al. | 269/133 |
| 2,503,388 | 4/1950 | Medlund | 269/321 F |
| 4,010,942 | 3/1977 | Ward | 269/17 |
| 4,138,099 | 2/1979 | Englehart | 269/17 |

Primary Examiner—Robert C. Watson
Attorney, Agent, or Firm—James E. Bradley

[57] ABSTRACT

A vise for thin objects such as doors has improved features that allows the doors to be transported on the vise and also accommodates various thicknesses of doors. The vise has a pair of jaws hinged together by a spring loaded hinge. The spring urges the jaws apart. The weight of the door overcomes the spring, drawing the jaws into contact with the door for support. Each jaw is mounted on a wheel for transporting. Each jaw also has an adjustable plate mounted on its inner side for varying the effective opening of the jaws.

6 Claims, 3 Drawing Figures

DOOR VISE

BACKGROUND OF THE INVENTION

1. Field of the Invention

This invention relates in general to hand tools for carpenters and in particular to a vise for supporting and transporting thin objects such as doors.

2. Description of the Prior Art

There are no devices widely in use for supporting and transporting doors. Normally a door to be hung is carried by hand or on some sort of cart to the door frame. The carpenter usually balances the door on its edge to cut the mortices for the hinges and latching mechanism. Balancing the door is an awkward task. ALso, hand carrying large doors is difficult and may be dangerous because of their weight and cumbersomeness.

Proposals have been made in the patented art for devices that will support a door on its edge while performing morticing operations. U.S. Pat. Nos. 342,187; 763,941; 1,042,232; and 1,715,722 all show vises for supporting doors. Basically, each shows a pair of jaws hinged together and urged apart from each other by a spring. The weight of the door overcomes the spring, drawing the jaws into contact with the door to support the door on its edge.

One disadvantage of these devices is that the door still must be hand carried to the point where it will be installed. The door is placed in the vise at that point. Another disadvantage is that except for U.S. Pat. No. 1,715,222, the jaws are spaced apart a fixed distance so that they will work best only with a single door thickness. If other sizes are used, the wrong thickness would provide inadequate support. U.S. Pat. No. 1,715,222 discloses adjustable jaws to vary the width, but the adjustment requires utilizing a screwdriver to loosen and retighten two screws for each change, thus is inconvenient.

There are, of course, many devices mounted on wheels for transporting goods, some of which are proposed specifically for doors. For example, see U.S. Pat. Nos. 4,138,099; 3,881,662; and 3,643,935. None of these, however, utilize the vise system as shown in the prior patents, wherein support is provided merely through the weight of the door. Rather, various clamping devices have to be tightened.

SUMMARY OF THE INVENTION

It is accordingly a general object of this invention to provide an improved device for supporting and transporting thin objects, such as doors, in an upright position.

It is a further object of this invention to provide an improved device for supporting thin objects, such as doors, in an upright position, and one that is easily adjustable to accommodate different thicknesses.

In accordance with these objects, a door vise is provided of the type having a pair of jaws hinged together and urged apart by springs. Wheels are mounted to the jaws to roll upon the floor, enabling the device to be used also as a transporting device.

Each jaw has an upright member with a plate carried on the inner side of it. The plate is secured to a threaded rod that allows it to be adjusted to various widths. The wheels have a brake for locking the vise into position during installation of the hardware on the door.

DESCRIPTION OF THE PREFERRED EMBODIMENT

Figure 1:
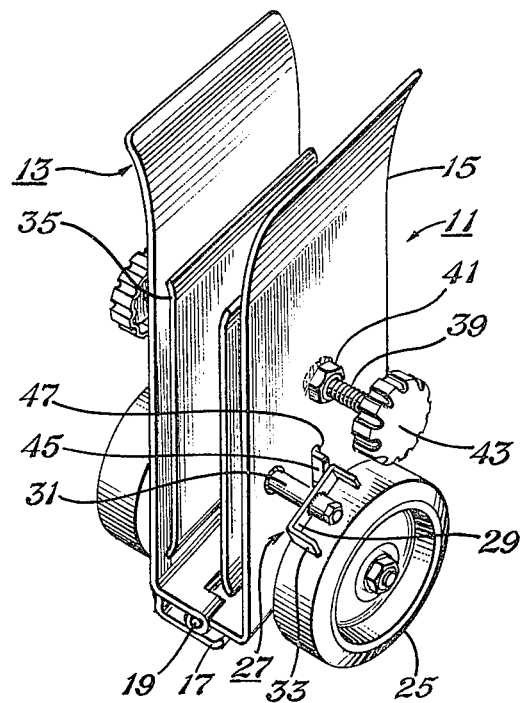
FIG. 1 is a perspective view of a vise constructed in accordance with this invention.

Referring to FIG. 1, vise 11 has a pair of jaws 13. Each jaw 13 has an upright member 15 and a base 17. The upright member 15 and the base 17 consist of a single flat strip of metal, with the base bent at a ninety degree angle with respect to the upright member 15. The upper edge of the upright member 15 is curved rigidly outward to facilitate entry of a door.

A hinge 19 connects the opposing edges of the bases 17 together. The hinge 19 allows the upright members 15 to pivot in a vertical plane as shown in the sequence between FIGS. 2 and 3. A spring 21 is secured to the bottom of the bases 17 to urge the upright members apart, to the open position shown in FIG. 2.

Figure 2:
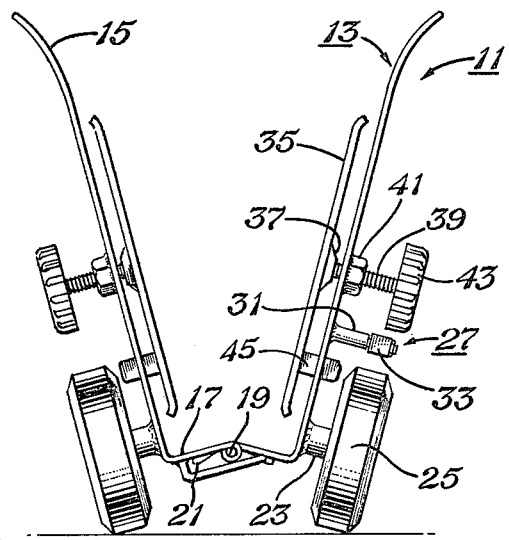
FIG. 2 is an end elevational view of the vise of FIG. 1, shown in the open position.

Referring to FIG. 2, an axle 23 is welded to the bottom of each upright member 15 normal to the upright member 15. A wheel 25 is rotatably mounted on each axle 23 for engaging the floor. A brake 27 is mounted above one of the wheels 25 to serve as brake means for selectively preventing rotation of the wheel 25. Brake 27 could be of various types, but it is shown in the preferred embodiment to be a band of metal having a central portion 29 that is parallel to its upright member 15 and pivotally connected to it by a rod 31. The central portion 29 has two ends 33 that are bent ninety degrees with respect to the central portion 29. Rod 31 is positioned so that one of the ends 33 can be pivoted down and wedged tightly against the surface of wheel 29, to prevent it from rolling. To release, the opposite end 33 is depressed.

A plate 35 serves as the door contacting portion of each upright member 15. Referring to FIG. 2, each plate 35 is carried by each upright member 15 on its inner side. Plate 35 is a flat metal strip about the width of the upright member 15, and about three fourths its height. Padding (not shown) is placed on the inner side of each plate 35 to avoid marring the surface of the door.

Plate 35 has a swivel member 37 that receives a threaded rod 39 mounted normal to each plate 35. A threaded nut 41 is welded to each upright member 51, which contains a mating aperture (not shown) for receiving the threaded rod 39. A handle or knob 43 is secured to the outer end of threaded rod 39 for facilitating rotation. To resist rotation of the plate 35 while threaded rod 39 is being rotated, a finger 45 extends normally from the outer side of each plate 35. Finger 45 extends slidingly through a slot or aperture 47 in each upright member 15. Finger 45, along with the threaded rod 39, and the associated connections, serve as adjusting means for selectively securing the plates to the upright members at various selected positions from the upright members with which each is secured.

Figure 3:
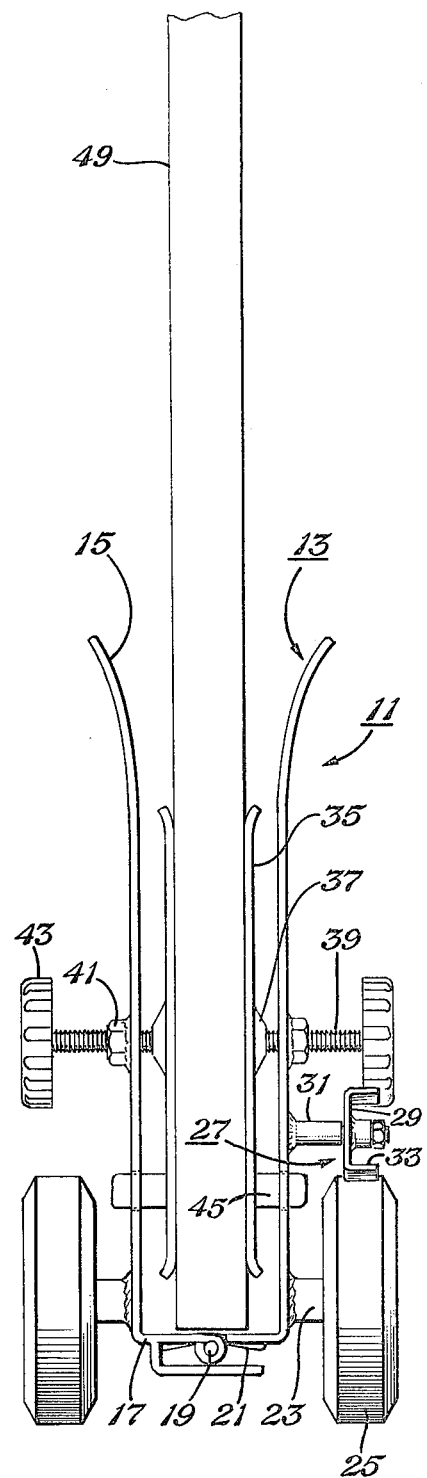
FIG. 3 is an end elevational view of the vise of FIG. 1, shown in a closed position.

In operation, the spring 21 will position the vise 11 normally as shown in FIG. 2. To carry a door 49, as shown in FIG. 3, the door is simply placed on one of its long edges in two of the vises 11, spaced along the length of the door. The weight of the door on base 17 overcomes the bias of the spring 21, and causes the jaws 13 to close toward each other. The plate 35 of each upright member 15 contacts the door and holds the door 49 in a vertical position. The distance between plates 35 determines the effective opening of the vises. If the door 49 is too thin or too thick, then plates 35 may not be parallel with the sides of the door 49, thus not providing full contact along the surfaces of the plates 35. This can be remedied by tightening or loosening threaded rod 39. Once the distance between the plates 35 is equal to the thickness of the door, then the plates 35 will be in a vertical orientation parallel with the sides of door 49, as shown in FIG. 3.

The door, after loading on two of the vises 11, as indicated, will be rolled to the site where it is to be hung. Once at the site, the brakes 27 are actuated to prevent any rolling while the carpenter mortices the door for the hardware. To work on the bottom edge, after the work on the upper edge has been performed, the door is simply picked up, rotated, and set back down into the vises. Because of the spring and hinge arrangement, no clamping will be necessary.

It should be apparent that an invention having significant advantages has been provided. The vise readily supports the door for morticing as well as transports it to the site of installation. The vise has means for quickly and easily accommodating different door thicknesses.

While the invention has been shown in only one of its forms, it should be apparent that it is not so limited, but is susceptible to various changes and modifications thereof.

I claim:

1. An improved vise for supporting and transporting a thin object, such as a door, in an upright position, comprising in combination:
   a pair of jaws, each jaw having an upright member and a base extending at an angle with respect to the upright member;
   a hinge securing the jaws together at the bases, allowing the upright members to pivot toward and away from each other;
   spring means for urging the upright members away from each other, the thin object adapted to be carried on an edge between the upright members, the weight of the thin object overcoming the spring means and drawing the upright members toward each other to support the thin object; and
   a wheel mounted to each jaw for rolling contact with a floor to transport the thin object.

2. The vise according to claim 1 further comprising:
   at least one plate carried by one of the jaws between the upright members; and
   adjusting means for selectively securing the plate in various selected positions from and parallel with the upright member from which it is carried, to vary the effective opening of the jaws to receive various thickness of thin objects.

3. The vise according to claim 1 further comprising:
   a pair of plates carried between the upright members to receive the thin object between the plates; and
   adjusting means for selectively securing each of the plates to one of the upright members at various selected positions from and parallel with the upright member from which it is carried, to vary the effective opening of the jaws to receive various thicknesses of thin objects.

4. The vise according to claim 3 wherein the adjusting means for each plate comprises:
   a threaded rod having a swivel on one end that is secured to the plate to allow rotation of the plate with respect to the rod, the rod extending through a threaded aperture in the upright member so that rotation of the rod advances and retracts the plate;
   a handle secured to the other end of the rod for rotating the rod; and
   a finger secured to the plate and extending laterally outward slidably through an opening in the upright member, to resist rotation of the plate when the rod is rotated.

5. The vise according to claim 1 or 4 further comprising:
   brake means secured to at least one of the wheels for selectively preventing rotation of the wheels.

6. An improved vise for supporting and transporting a thin object, such as a door, in an upright position, comprising in combination:
   a pair of jaws, each jaw having an upright member and a base extending laterally from the upright member;
   a hinge securing the bases together and allowing the upright members to pivot toward and away from each other;
   spring means for urging the upright members away from each other;
   a plate carried by each jaw on an inner side of and parallel with the upright member;
   adjusting means for selectively varying the distance between the plates to select the effective opening of the jaws;
   a wheel carried by each jaw for rolling contact with the ground to transport a thin object; and
   brake means for selectively preventing rotation of the wheels.

* * * * *